United States Patent
Shen et al.

(10) Patent No.: US 11,046,522 B2
(45) Date of Patent: Jun. 29, 2021

(54) HIGHLY WEAR-RESISTANT TILE, AND CONVEYOR BELT HAVING SAME

(71) Applicant: ZHEJIANG DOUBLE ARROW RUBBER CO., LTD, Tongxiang (CN)

(72) Inventors: Huimin Shen, Tongxiang (CN); Bingjian Zhuang, Tongxiang (CN)

(73) Assignee: ZHEJIANG DOUBLE ARROW RUBBER CO., LTD., Tongxiang (CN)

( * ) Notice: Subject to any disclaimer, the term of this patent is extended or adjusted under 35 U.S.C. 154(b) by 0 days.

(21) Appl. No.: 16/607,002

(22) PCT Filed: Sep. 30, 2018

(86) PCT No.: PCT/CN2018/109012
§ 371 (c)(1),
(2) Date: Oct. 21, 2019

(87) PCT Pub. No.: WO2019/076197
PCT Pub. Date: Apr. 25, 2019

(65) Prior Publication Data
US 2020/0130941 A1    Apr. 30, 2020

(30) Foreign Application Priority Data
Oct. 18, 2017  (CN) .......................... 201710970449.4

(51) Int. Cl.
*B65G 15/42* (2006.01)
*B65G 15/38* (2006.01)

(52) U.S. Cl.
CPC ............. *B65G 15/42* (2013.01); *B65G 15/38* (2013.01); *B65G 2207/48* (2013.01)

(58) Field of Classification Search
CPC ........ B65G 15/38; B65G 15/42; B65G 15/32; B65G 2207/48
(Continued)

(56) References Cited

U.S. PATENT DOCUMENTS 1,508,481 A * 9/1924 Erland .................... B65G 15/48
198/846
4,855,174 A * 8/1989 Kawamoto ............ B65D 90/06
428/67

(Continued)

FOREIGN PATENT DOCUMENTS

EP              195907    * 10/1986 ............. B65G 15/42

*Primary Examiner* — James R Bidwell
(74) *Attorney, Agent, or Firm* — Jiwen Chen; Jacobson Holman PLLC

(57) ABSTRACT

A highly wear-resistant tile, and a conveyor belt having the highly wear-resistant tile, the conveyor belt including highly wear-resistant tiles (6) and a main body (7). The highly wear-resistant tiles (6) includes a tile main body (1). An upper portion of the tile main body (1) has two first holes (2) extending downward. Central axes of the two first holes (2) are in the same plane, and lower ends of the first holes (2) have a chamfered structure. A reference hole (3) extending upward is provided at a center position of a lower portion of the main body (1). Two sets of second holes (4) of identical shape and size are provided at a periphery of the reference hole (3) and are separated by 90°. Each set of the second holes (4) has a center line in the same plane as a center line of the reference hole (3). Lower ends of the reference hole (3) and second holes (4) have a chamfered structure. The highly wear-resistant tiles (6) do not suffer from fatigue or wear, and do not detach from the main body (7) of the conveyor belt, thus increasing the service life of the conveyor belt.

13 Claims, 3 Drawing Sheets

(58) Field of Classification Search
USPC .................................................. 198/846, 847
See application file for complete search history.

(56) References Cited

U.S. PATENT DOCUMENTS

| | | | | |
|---|---|---|---|---|
| 5,943,951 | A * | 8/1999 | Muellner | D21F 3/02 |
| | | | | 100/37 |
| 6,148,496 | A * | 11/2000 | McGuire | B44B 5/026 |
| | | | | 29/428 |
| 8,039,075 | B2 * | 10/2011 | Malmberg | B32B 3/266 |
| | | | | 428/44 |
| 8,507,098 | B2 * | 8/2013 | Long | C04B 41/5023 |
| | | | | 428/426 |
| 10,543,985 | B2 * | 1/2020 | Baric | B02C 17/22 |
| 2008/0317992 | A1 * | 12/2008 | Malmberg | B65G 11/16 |
| | | | | 428/44 |

* cited by examiner

HIGHLY WEAR-RESISTANT TILE, AND CONVEYOR BELT HAVING SAME

This is a U.S. national stage application of PCT Application No. PCT/CN2018/109012 under 35 U.S.C. 371, filed Sep. 30, 2018 in Chinese, claiming priority of Chinese Application No. 201710970449.4, filed Oct. 18, 2017, which is hereby incorporated by reference.

TECHNICAL FIELD OF THE INVENTION

The present invention relates to a technical field of conveyor belts and in particular to a highly wear-resistant tile and a conveyor belt having the same.

BACKGROUND OF THE INVENTION

At present, when conveyor belts are in use, the upper surface of commercially available conveyor belts configured to convey objects such as granules, powder or other minerals will be in direct contact with the objects to be conveyed. As a result, after six months of use, rubber on the surface of the conveyor belts has been gradually worn off. Thus, the normal conveying operation is affected and the service life of the conveyor belts is reduced. In view of this, multiple ceramic plugs are laid on the surface of the conveyor belt by binding agents, in order to increase the service life of the conveyor belts. However, this method has disadvantages that the binding agent is likely to become ineffective because of aging and the ceramic plugs are likely to become loosened or even drop.

To effectively solve the above problems, a ceramic wear-resistant tile has been provided in Patent No. 200420028794.4, entitled "CERAMIC WEAR-RESISTANT TILE". The ceramic wear-resistant tile according to the patent comprises ceramic sheets each having a fixed hole in the center and plugs that are cylinders each having a flat slot formed on its upper surface. The upper portion of the fixed hole is cylindrical and is matched with the plug. Threaded fasteners are arranged on both the sidewall of the plug and the inner wall of the fixed hole. However, when in use of the ceramic wear-resistant tile in such a structure, rubber at joints between the wear-resistant tiles will be gradually worn off. With the mechanical fatigue and the thermal fatigue of the conveyor belt, the bonding between the conveyor belt and the wear-resistant tiles will be gradually degraded. Consequently, the wear-resistant tiles will drop from the conveyor belt. The service life is reduced.

Those problems have to be solved urgently.

SUMMARY OF THE INVENTION

To overcome the shortcomings of the prior art, an object of the present invention is to provide a highly wear-resistant tile which is less likely to drop, good in wear resistance and long in service life, and will not cause a shear force, and a conveyor belt having the same.

For this purpose, the present invention provides a highly wear-resistant tile, comprising a tile body; in an upper portion of the tile body, there are two or more first holes extending downward, central axes of which are in a same plane, with upper ends of the first holes being of a chamfered structure; in the middle of a lower portion of the tile body, there is one reference hole extending upward, and one or more groups of second holes are formed around the reference hole, with a centerline of each group of second holes being in a same plane as a centerline of the reference hole and both a lower end of the reference hole and a lower end of the second holes being of a chamfered structure. In a horizontal direction of the tile body, by one or more transverse cavities, all the first holes, the reference hole and the second holes are integrally connected to form a hollow chamber, so that rubber flows from the first holes toward the reference hole and the second holes through the hollow chamber and finally fills the whole hollow chamber; and on the tile body, an edge formed when a surface meets with another surface is of a chamfered structure having a chamfer of greater than 0.02 mm.

The formation of one group of second holes around the reference hole means formation of one or two second holes on each of left and right sides of the reference hole or symmetrical formation of one or two second holes on each of left and right sides of the reference hole.

The formation of more groups of second holes around the reference hole means formation of at least two groups of second holes around the reference hole, at a certain angle that is 30°, 45°, 60° or 90°, each group of second holes being formed by using the reference hole as the center, with one or more second holes being formed on each of left and right sides of the reference hole or with one or more second holes being symmetrically formed on each of left and right sides of the reference hole.

The first holes, the reference hole and the second holes are of the same shape, that is, an orthographic projection of the first holes, the reference hole and the second holes is circular, elliptic, rectangular or regular hexagonal, and the first holes, the reference hole and the second holes have a hole diameter of greater than 1 mm.

The first holes, the reference hole and the second holes have a chamfer of greater than 0.02 mm. The design of one end of the reference hole, the first holes and the second holes in a chamfered structure is to ensure a stable machining process, without causing a shear force, nor damaging the rubber inside the hollow chamber and the highly wear-resistant tile itself.

The transverse cavity arranged on the tile body runs through the horizontal direction of the whole tile body.

To facilitate the machining, an orthographic projection of the tile body is circular, elliptic, rectangular or regular hexagonal. Of course, it may be in other geometric structures.

The whole highly wear-resistant tile is made of ceramic or metal material.

This highly wear-resistant tile may be applied on a conveyor belt, or on other parts and products to be enhanced in their surface wear resistance.

The present invention provides a conveyor belt having highly wear-resistant tiles, comprising highly wear-resistant tiles and a conveyor belt body; a plurality of highly wear-resistant tiles are laid on an upper surface of the conveyor belt body by a bonding layer at a same spacing of greater than 2 mm, with the upper surface of the highly wear-resistant tiles being flush with the upper surface of the conveyor belt body. The highly wear-resistant tile comprises a tile body, and in an upper portion of the tile body, there are two or more first holes extending downward, central axes of which are in a same plane, with upper ends of the first holes being of a chamfered structure. In the middle of a lower portion of the tile body, there is one reference hole extending upward, and one or more groups of second holes are formed around the reference hole, with a centerline of each group of second holes being in a same plane as a centerline of the reference hole and both a lower end of the reference hole and a lower end of the second holes being of a chamfered structure. In a horizontal direction of the tile body, by one or more transverse cavities, all the first holes, the reference hole and the second holes are integrally connected to form a hollow chamber, so that rubber flows from the first holes toward the reference hole and the second holes through the hollow chamber and finally fills the whole hollow chamber; and on the tile body, an edge formed when a surface meets with another surface is of a chamfered structure having a chamfer of greater than 0.02 mm.

The formation of one group of second holes around the reference hole means formation of one or two second holes on each of left and right sides of the reference hole or symmetrical formation of one or two second holes on each of left and right sides of the reference hole.

The formation of more groups of second holes around the reference hole means formation of at least two groups of second holes around the reference hole, at a certain angle that is 30°, 45°, 60° or 90°, each group of second holes being formed by using the reference hole as the center, with one or more second holes being formed on each of left and right sides of the reference hole or with one or more second holes being symmetrically formed on each of left and right sides of the reference hole.

The first holes, the reference hole and the second holes are of the same shape, that is, an orthographic projection of the first holes, the reference hole and the second holes is circular, elliptic, rectangular or regular hexagonal, and the first holes, the reference hole and the second holes have a hole diameter of greater than 1 mm.

The first holes, the reference hole and the second holes have a chamfer of greater than 0.02 mm. The design of one end of the reference hole, the first holes and the second holes in a chamfered structure is to ensure a stable machining process, without causing a shear force, nor damaging the rubber inside the hollow chamber and the highly wear-resistant tile itself.

The transverse cavity arranged on the tile body runs through the horizontal direction of the whole tile body.

To facilitate the machining, an orthographic projection of the tile body is circular, elliptic, rectangular or regular hexagonal. Of course, it may be in other geometric structures.

The highly wear-resistant tile in the conveyor belt having highly wear-resistant tiles is made of ceramic or metal material.

The conveyor belt body is made of rubber material.

The highly wear-resistant tile in such a structure will not drop after being bonded onto the conveyor belt body, because the highly wear-resistant tile has a hollow chamber that is communicated both in the transverse direction and in the longitudinal direction. The hollow chamber is full of rubber, and thus will become an arched structure when being stressed. Accordingly, the highly wear-resistant tile will not drop from the conveyor belt. Furthermore, since the highly wear-resistant tile is full of rubber that is not in direct contact with outside objects, it will not suffer from fatigue or wear.

Compared with existing conveyor belts, the service life of the conveyor belt having highly wear-resistant tiles in such a structure is increased by three times.

Accordingly, with regard to the highly wear-resistant tile and the conveyor belt having the same in the present invention, by the unique structural design, the highly wear-resistant tile will not suffer from fatigue or wear and will not drop from the conveyor belt body. The service life of the conveyor belt is increased. Therefore, it has advantages of simple structure, easy operation and appropriate design.

DETAILED DESCRIPTION OF THE INVENTION

Embodiment 1

The present invention will be further described below with reference to the accompanying drawings.

Figure 1:
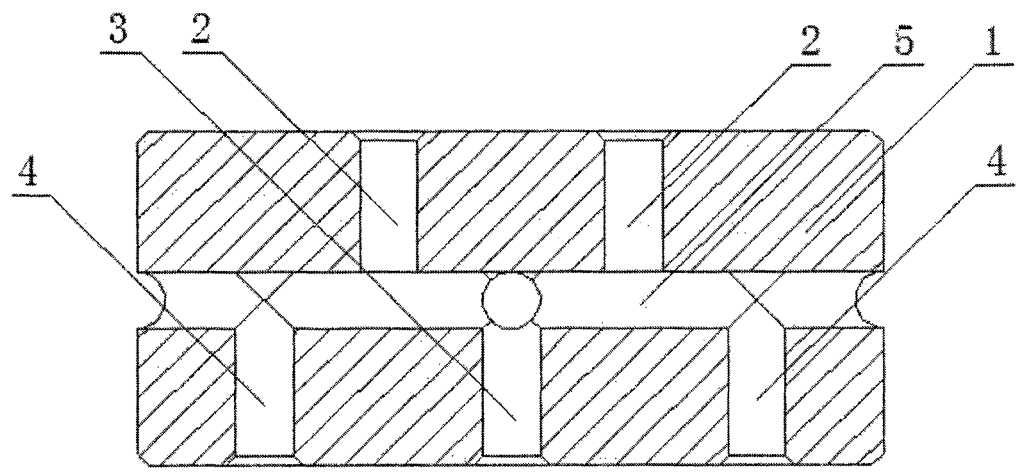
FIG. 1 is an overall front view of Embodiment 1.
Figure 2:
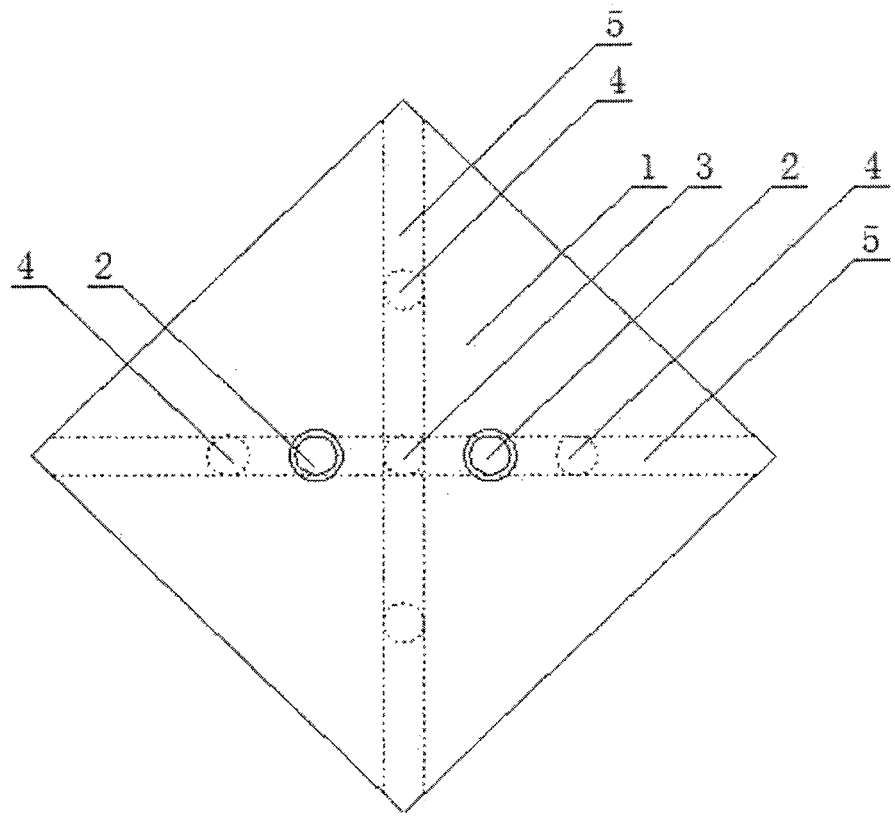
FIG. 2 is a top view of Embodiment 1.

As shown in FIGS. 1 and 2, the highly wear-resistant tile in this embodiment comprises a tile body 1. An orthographic projection of the tile body 1 is rectangular. In an upper portion of the tile body 1, there are two first holes 2 extending downward. The first holes 2 have a hole diameter of 2 mm. Central axes of the two first holes 2 are in a same plane, and a lower end of the first holes 2 is of a chamfered structure having a chamfer of 0.02 mm. In the middle of a lower portion of the tile body 1, there is one reference hole 3 extending upward. Two groups of second holes 4 of the same shape and size are formed around the reference hole 3 at an angle of 90°, with a centerline of each group of second holes 4 being in a same plane as a centerline of the reference hole 3. Both a lower end of the reference hole 3 and a lower end of the second holes 4 are of a chamfered structure having a chamfer of 0.02 mm. In a horizontal direction of the tile body 1, by two transverse cavities 5, all the first holes 2, the reference hole 3 and the second holes 4 are integrally connected to form a hollow chamber, so that rubber flows from the first holes 2 toward the reference hole 3 and the second holes 4 through the hollow chamber and finally fills the whole hollow chamber. On the tile body 1, twelve edges formed when a surface meets with another surface are all of a chamfered structure having a chamfer of 0.02 mm.

Embodiment 2

The present invention will be further described below with reference to the accompanying drawings.

Figure 3:
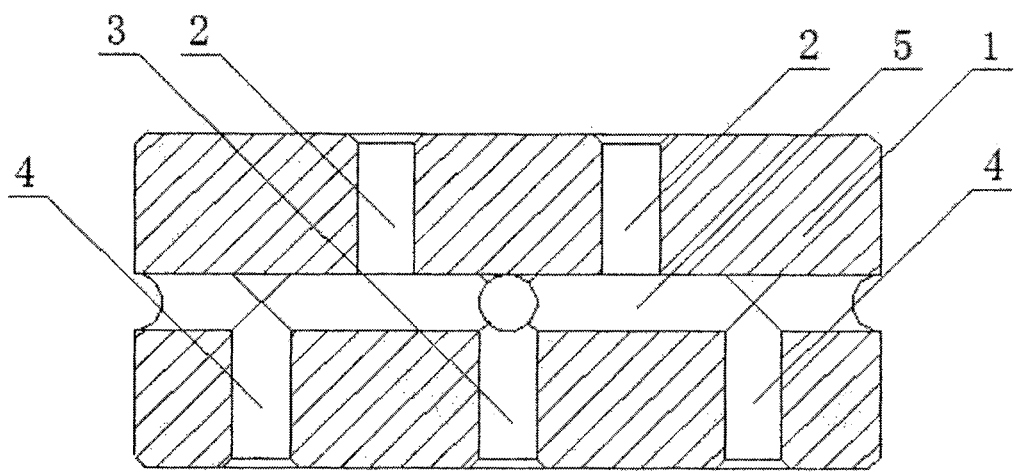
FIG. 3 is an overall front view of Embodiment 2.
Figure 4:
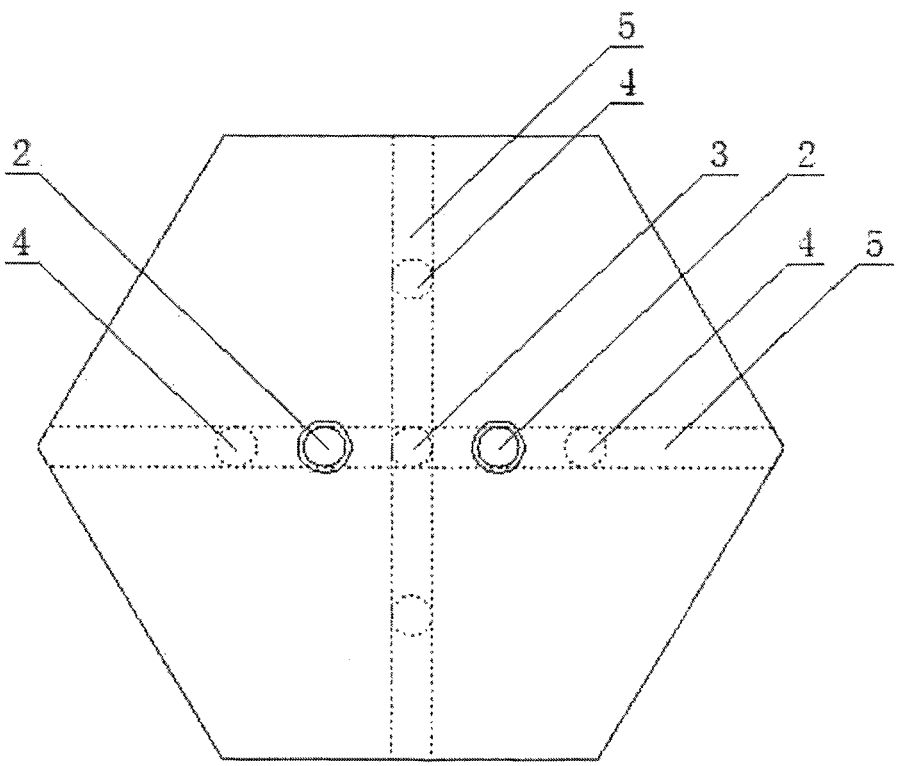
FIG. 4 is a top view of Embodiment 2.

As shown in FIGS. 3 and 4, the other structural features of the highly wear-resistant tile in this embodiment are the same as the structure of Embodiment 1. It is characterized in that an orthographic projection of the tile body 1 is regular hexagonal, first holes 2 on the tile body 1 have a hole diameter of 3 mm, and a lower end of the first holes 2 is of a chamfered structure having a chamfer of 0.03 mm; the reference hole 3 and the second holes 4 have a hole diameter of 3 mm, and a lower end of the reference hole 3 and the second holes 4 is of a chamfered structure having a chamfer of 0.03 mm; and on the tile body 1 that is regular hexagonal, eighteen edges formed when a surface meets with another surface are all of a chamfered structure having a chamfer of 0.03 mm.

Embodiment 3

The present invention will be further described below with reference to the accompanying drawings.

Figure 5:
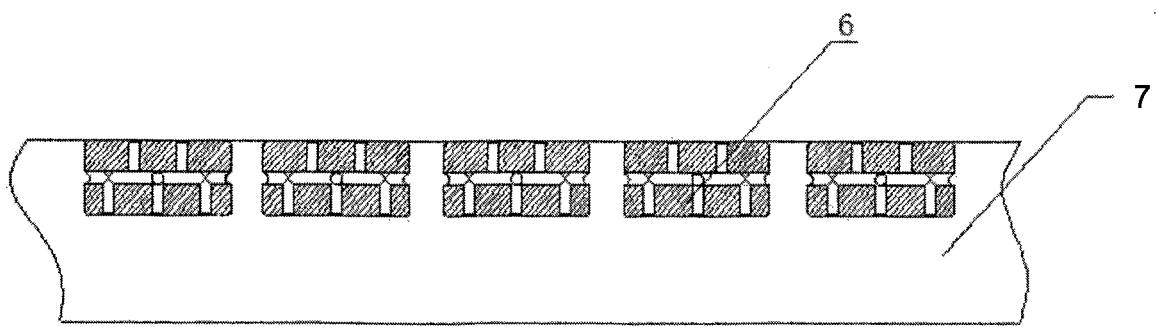
FIG. 5 is a structural diagram of a conveyor belt having highly wear-resistant tiles in Embodiment 3.
Figure 6:
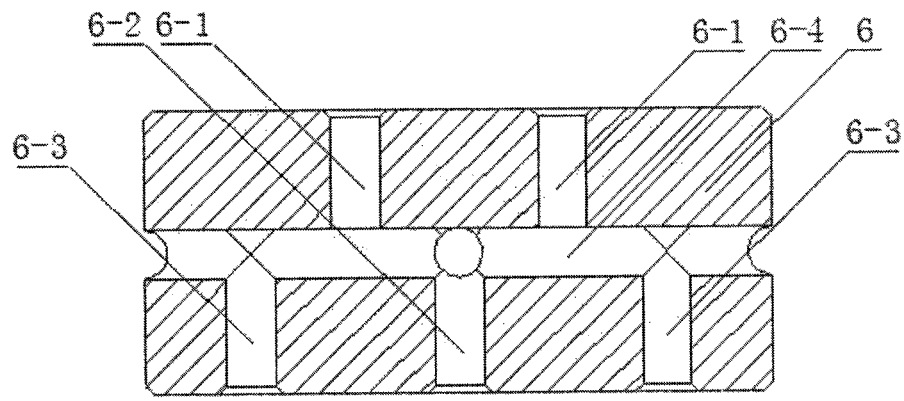
FIG. 6 is an overall front view of the highly wear-resistant tile in Embodiment 3.
Figure 7:
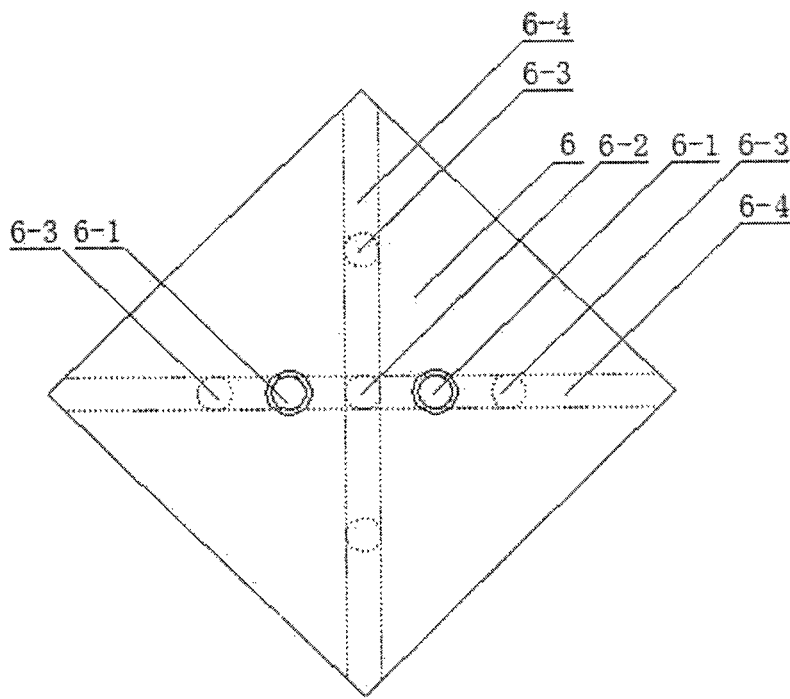
FIG. 7 is a top view of the highly wear-resistant tile in Embodiment 3.

As shown in FIGS. 5, 6 and 7, this embodiment provides a conveyor belt having highly wear-resistant tiles, comprising highly wear-resistant tiles 6 and a conveyor belt body 7. A plurality of highly wear-resistant tiles 6 are laid on an upper surface of the conveyor belt body 7 by a bonding layer at a same spacing of 3 mm, with the upper surface of the highly wear-resistant tiles 6 being flush with the upper surface of the conveyor belt body 7. An orthographic projection of the highly wear-resistant tiles 6 is rectangular. In an upper portion of the highly wear-resistant tiles 6, there are two first holes 6-1. The first hole 6-1 has a hole diameter of 2 mm. Central axes of the two first holes 6-1 are in a same plane, and a lower end of the first holes 6-1 is of a chamfered structure having a chamfer of 0.02 mm. In the middle of a lower portion of the highly wear-resistant tiles 6, there is one reference hole 6-2 extending upward. Two groups of second holes 6-3 of the same shape and size are formed around the reference hole 6-2 at an angle of 90°, with a centerline of each group of second holes 6-3 being in a same plane as a centerline of the reference hole 6-2. Both a lower end of the reference hole 6-2 and a lower end of the second holes 6-3 are of a chamfered structure having a chamfer of 0.02 mm. In a horizontal direction of the highly wear-resistant tiles 6, by two transverse cavities 6-4, all the first holes 6-1, the reference hole 6-2 and the second holes 6-3 are integrally connected to form a hollow chamber, so that rubber flows from the first holes 6-1 toward the reference hole 6-2 and the second holes 6-3 through the hollow chamber and finally fills the whole hollow chamber. On the highly wear-resistant tiles 6, twelve edges formed when a surface meets with another surface are all of a chamfered structure having a chamfer of 0.02 mm.

The invention claimed is:

1. A highly wear-resistant tile, comprising a tile body; in an upper portion of the tile body, there are two or more first holes extending downward, central axes of which are in a same plane, with upper ends of the first holes being of a chamfered structure; in the middle of a lower portion of the tile body, there is one reference hole extending upward, and one or more groups of second holes are formed around the reference hole, with a centerline of each group of second holes being in a same plane as a centerline of the reference hole and both a lower end of the reference hole and a lower end of the second holes being of a chamfered structure; in a horizontal direction of the tile body, by one or more transverse cavities, all the first holes, the reference hole and the second holes are integrally connected to form a hollow chamber, so that rubber flows from the first holes toward the reference hole and the second holes through the hollow chamber and finally fills the whole hollow chamber; and on the tile body, an edge formed when a surface meets with another surface is of a chamfered structure having a chamfer of greater than 0.02 mm.

2. The highly wear-resistant tile according to claim 1, characterized in that the formation of one group of second holes around the reference hole means formation of one or two second holes on each of left and right sides of the reference hole or symmetrical formation of one or two second holes on each of left and right sides of the reference hole.

3. The highly wear-resistant tile according to claim 1, characterized in that the formation of more groups of second holes around the reference hole means formation of at least two groups of second holes around the reference hole, at a certain angle that is 30°, 45°, 60° or 90°, each group of second holes being formed by using the reference hole as the center, with one or more second holes being formed on each of left and right sides of the reference hole or with one or more second holes being symmetrically formed on each of left and right sides of the reference hole.

4. The highly wear-resistant tile according to claim 1, characterized in that the first holes, the reference hole and the second holes are of the same shape, that is, an orthographic projection of the first holes, the reference hole and the second holes is circular, elliptic, rectangular or regular hexagonal; and the first holes, the reference hole and the second holes have a hole diameter of greater than 1 mm.

5. The highly wear-resistant tile according to claim 1, characterized in that the first holes, the reference hole and the second holes have a chamfer of greater than 0.02 mm.

6. The highly wear-resistant tile according to claim 1, characterized in that the transverse cavity arranged on the tile body runs through the horizontal direction of the whole tile body.

7. A conveyor belt having highly wear-resistant tiles, comprising a plurality of the highly wear-resistant tiles according to claim 1 and a conveyor belt body; multiple highly wear-resistant tiles are laid on an upper surface of the conveyor belt body by a bonding layer at a same spacing of greater than 2 mm, with the upper surface of the highly wear-resistant tiles being flush with the upper surface of the conveyor belt body.

8. The conveyor belt having highly wear-resistant tiles according to claim 7, characterized in that the formation of one group of second holes around the reference hole means formation of one or two second holes on each of left and right sides of the reference hole or symmetrical formation of one or two second holes on each of left and right sides of the reference hole.

9. The conveyor belt having highly wear-resistant tiles according to claim 7, characterized in that the formation of more groups of second holes around the reference hole means formation of at least two groups of second holes around the reference hole, at a certain angle that is 30°, 45°, 60° or 90°, each group of second holes being formed by using the reference hole as the center, with one or more second holes being formed on each of left and right sides of the reference hole or with one or more second holes being symmetrically formed on each of left and right sides of the reference hole.

10. The conveyor belt having highly wear-resistant tiles according to claim 8, characterized in that the first holes, the reference hole and the second holes are of the same shape, that is, an orthographic projection of the first holes, the reference hole and the second holes is circular, elliptic, rectangular or regular hexagonal; the first holes, the reference hole and the second holes have a hole diameter of greater than 1 mm, and the first holes, the reference hole and the second holes have a chamfer of greater than 0.02 mm.

11. The highly wear-resistant tile according to claim 2, characterized in that the first holes, the reference hole and the second holes are of the same shape, that is, an orthographic projection of the first holes, the reference hole and the second holes is circular, elliptic, rectangular or regular hexagonal; and the first holes, the reference hole and the second holes have a hole diameter of greater than 1 mm.

12. The highly wear-resistant tile according to claim 3, characterized in that the first holes, the reference hole and the second holes are of the same shape, that is, an orthographic projection of the first holes, the reference hole and the second holes is circular, elliptic, rectangular or regular hexagonal; and the first holes, the reference hole and the second holes have a hole diameter of greater than 1 mm.

13. The conveyor belt having highly wear-resistant tiles according to claim 9, characterized in that the first holes, the reference hole and the second holes are of the same shape, that is, an orthographic projection of the first holes, the reference hole and the second holes is circular, elliptic, rectangular or regular hexagonal; the first holes, the reference hole and the second holes have a hole diameter of greater than 1 mm, and the first holes, the reference hole and the second holes have a chamfer of greater than 0.02 mm.

* * * * *